UNITED STATES PATENT OFFICE.

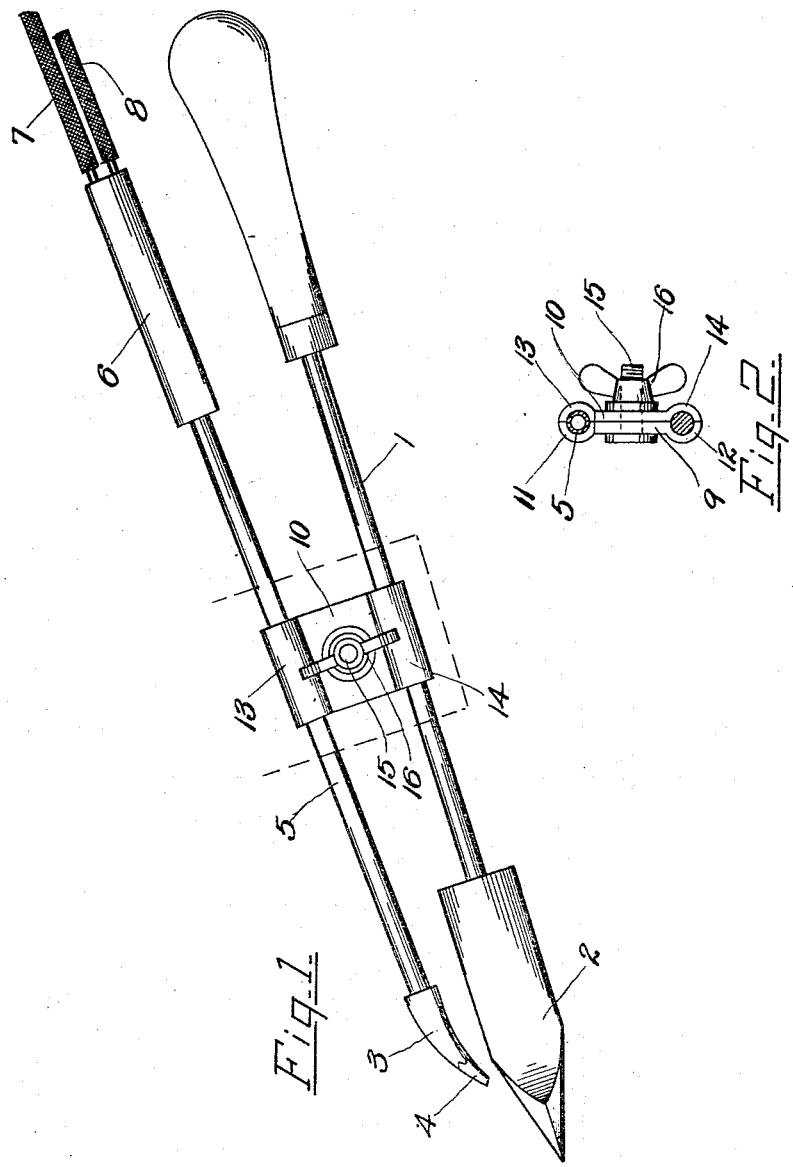

ANDREW A. KRAMER, OF KANSAS CITY, MISSOURI.

SOLDERING-IRON.

1,285,239.

Specification of Letters Patent.

Patented Nov. 19, 1918.

Application filed May 27, 1918. Serial No. 236,751.

*To all whom it may concern:*

Be it known that I, ANDREW A. KRAMER, a citizen of the United States, residing at Kansas City, in the county of Jackson and State of Missouri, have invented certain new and useful Improvements in Soldering-Irons; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to soldering irons and particularly to a heater therefor. One of the objects of the invention is to provide means for applying a heater to an ordinary form of soldering iron without the necessity of altering the construction of the iron. Another object of the invention is to provide a soldering iron with a portable and detachable burner, the burner being so disposed with relation to the point of the iron that the heat will be applied in the most effective manner. In carrying out the invention I prefer to employ an oxyacetylene flame, although the invention contemplates the utilization of other fuel.

In the drawings:

Figure I is a side elevational view of an iron and heater constructed in accordance with my invention, and Fig. II is an edge view of the clamp, the burner tube and soldering iron shank being shown in section.

Referring now to the drawings by numerals of reference;

1 designates a soldering iron with the usual shank and handle and the soldering iron point 2. Associated with the iron is a heater comprising a burner 3 curved inwardly toward the iron when in place and having a discharge orifice 4. The burner is provided with a burner tube 5 communicating with a mixing chamber 6 which is adapted to receive the constituents of the fuel to be burned. In the present instance the tube 7 may be used for conveying acetylene and the tube 8 may convey oxygen with the result that the two constituents are mixed in the chamber and an oxyacetylene flame will be produced at the burner orifice 4 to play upon the point of the soldering iron. I have provided means for connecting the burner to the soldering iron in fixed relation. The means here shown consists of a clamp comprising two plate members 9 and 10. Opposite edges of the plate 9 having grooved, fixed jaws 11 and 12 while similar jaws 13 and 14 are provided on the plate 10. The jaws 11 and 13 are adapted to grip the burner tube 5 while the jaws 12 and 14 embrace the shank of the said iron 1. The plates may be held in a clamping position by means of a bolt 15 extended through registering openings in the plates and the winged nut which is threaded on said bolt. The tighter the winged nut 16 is screwed on the bolt the tighter will be the clamping effect on the jaws. It will be observed that the pairs of jaws on the respective plates slightly converge so that by moving the clamp longitudinally the burner orifice 4 can be adjusted toward and away from the iron point 2. Where an oxyacetylene flame is employed, an intense heat can be generated in a comparatively short time. From the foregoing it will be apparent that the burners can be attached to any standard form of soldering iron without altering the construction of the iron but if desired, the whole organization may be readily constructed in the factory as a unitary structure.

Having thus described my invention, what I claim as new therein and desire to secure by Letters-Patent, is:—

1. A soldering iron, a burner and means for clamping the two together, said means comprising two plates having alining concave edges providing clamp jaws and means for securing the two plates together.

2. A soldering iron, a burner and means for clamping the two together, said means comprising two plates having alining concave edges providing clamp jaws and a screw connection between the plates.

3. The combination with a soldering iron, of a gas burner for the soldering iron point and provided with a tube and a clamp connecting the tube to the shank of the soldering iron, said clamp comprising two plates having converging clamping jaws and means for securing the two plates together.

4. The combination with a soldering iron comprising a bit or toe, a shank extending therefrom and a handle, of a gas heater comprising an elongated tube with a flame discharge nozzle adjacent to the point of the bit or toe and a clamping means for connecting the elongated tube of the burner and the shank of the soldering iron together.

In testimony whereof I affix my signature.

ANDREW A. KRAMER.

Copies of this patent may be obtained for five cents each, by addressing the "Commissioner of Patents, Washington, D. C."